US007903727B2

(12) United States Patent
Xia et al.

(10) Patent No.: US 7,903,727 B2
(45) Date of Patent: Mar. 8, 2011

(54) CHANNEL MEMORY LENGTH SELECTION METHOD AND APPARATUS FOR WIRELESS COMMUNICATION SYSTEMS

(75) Inventors: Yuan Xia, Taipei (TW); Min Lei, Taipei (TW); Lijun Zhang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 1139 days.

(21) Appl. No.: 11/563,083

(22) Filed: Nov. 24, 2006

(65) Prior Publication Data

US 2008/0123728 A1 May 29, 2008

(51) Int. Cl.
*H03H 7/30* (2006.01)
(52) U.S. Cl. ............... 375/231; 379/390.02; 379/394; 379/398; 708/323; 375/232; 375/229; 398/149
(58) Field of Classification Search .............. None
See application file for complete search history.

(56) References Cited

U.S. PATENT DOCUMENTS

| 6,304,599 | B1 | 10/2001 | Igarashi |
| 6,999,521 | B1 | 2/2006 | Azadet et al. |
| 2004/0037381 | A1 | 2/2004 | Hwang et al. |
| 2006/0039492 | A1 | 2/2006 | Azadet et al. |
| 2010/0040176 | A1* | 2/2010 | Valadon et al. ............ 375/340 |

OTHER PUBLICATIONS

Khong et al. (Stereophonic Acoustic Echo cancellation Employing Selective Tap Adaptive Algorithms, IEEE Transactions on Audio, Speech & Language Processing; May 2006; pp. 785-796).*

* cited by examiner

*Primary Examiner* — David C Payne
*Assistant Examiner* — Adolf Dsouza
(74) *Attorney, Agent, or Firm* — Squire, Sanders & Dempsey (US) LLP

(57) ABSTRACT

A channel memory length selection method for wireless communication systems is provided. The method comprises estimating an initial channel impulse response (CIR) for the wireless communication system; determining a first refined CIR with a first group of taps and a second refined CIR with a second group of taps based upon the initial CIR, number of the second group of taps being less than number of the first group of taps; and selecting either the number of the first group of taps or the number of the second group of taps as the channel memory length according to an energy concentration criterion in regard to the first refined CIR and the second refined CIR.

20 Claims, 3 Drawing Sheets

---

Estimating an initial CIR h0 30

↓

Executing sliding window searches over the initial CIR h0 twice with window sizes L1 and L2 and finding out two refined CIRs h1 and h2 respectively with maximum energy E1 and E2, in which L1 is larger than L2
32

↓

If the ratio E2/E1 is larger than a predetermined value Ra, then the channel memory length is set to L2, otherwise the channel memory length is set to L1
34

CHANNEL MEMORY LENGTH SELECTION METHOD AND APPARATUS FOR WIRELESS COMMUNICATION SYSTEMS

BACKGROUND OF THE INVENTION

1. Field of the Invention

The present invention relates to digital communications, and more particularly to a channel memory length selection method for wireless communication systems.

2. Description of the Prior Art

Transmission channels suffer from time-varying frequency selective fading in many wireless communication environments. The time-varying frequency selective fading in turn causes inter-symbol interference (ISI) problem at the receiving side of a wireless communication system. Before the transmitted data sequence being estimated in an equalizer, the channel memory length as well as the impulse response of current transmission channel should be estimated as accurate as possible.

In practice, wireless communication systems may operate in channel profiles having very different delay spread. In GSM/EDGE (Global System for Mobile communication/Enhanced Data rates for Global Evolution), for example, the largest delay may be 0.5 us (micro-second) in a rural area (RA) model, but may be up to 20 us in a hilly terrain (HT) model. Since the GSM symbol duration is about 3.69 us, the largest delays of the two models will last to about first and sixth taps of symbols respectively. This phenomenon makes it difficult to settle a constant channel memory length for all potential channel profiles. Both over-estimation and under-estimation of the channel memory length will lead to a degradation of the equalizer.

FIG. 1 shows a schematic block diagram of a typical equalizer 100 in accordance with prior arts. Equalizer 100 contains a channel estimation unit 110 and a data estimation unit 120. The channel estimation unit 110 takes a received signal r(k) and a training sequence b(k) as inputs and outputs an estimated channel impulse response (CIR) h(k) to the data estimation unit 120 for subsequent equalization processing. In GSM protocol, for example, each burst of received signal r(k) in average contains 156.25 bits in the corresponding time slot. The training sequence b(k) is a known pattern resided in a burst for reconstruction of transmitted signals. Those skilled in the art will appreciate that the taps of CIR estimation h(k) may be obtained from the cross-correlation of the received signal r(k) and the training sequence b(k) as shown in the formula below:

$$h(k) = \frac{1}{N}\sum_{i=0}^{N-1} b(i)*r(k+i), \quad k=0,1,\cdots L-1$$

in which N is a properly selected number according to system design and L is referred to a number of the CIR taps capable of covering the worst case communication environment. For example, N may be 26 to use all the training sequence bits to estimate the CIR. Usually, a number less than 26 may be used under efficiency consideration. Other methods well known to those skilled in the art can also be used to estimate the CIR.

FIG. 2 shows a known method to select an appropriate channel memory length best fitting the actual communication environment. The method includes computing an initial CIR estimation (step 20); determining a refined CIR of length $L_M$ with a maximum energy $E_M$ by sliding widow searching the initial CIR estimation (step 22); eliminating taps less than the product of a ratio R and the maximum energy $E_M$ in the refined CIR, in which the energy of a CIR may be evaluated by a sum of all taps of the CIR (step 24). The number of taps of the resulted refined CIR is selected as the channel memory length (step 26), and the refined CIR can be used for operation in subsequent stages to the equalizer.

The foregoing method does not consider the variation between different environments. In a typical low delay spread environment, most energy may concentrate in a limited number of taps, therefore a larger value of the ratio R may be required to remove redundant taps which are essentially introduced by fading or noise. On the contrary, in a high delay spread environment, energy may spread over more channel taps. In such case, a smaller ratio R may be required.

SUMMARY OF THE INVENTION

One object of the present invention is to provide a channel memory length selection method for wireless communication systems, the method adapting the channel memory length selection in real time.

Another object of the present invention is to provide a channel memory length selection method based on energy comparison between different channel impulse responses.

Another object of the present invention is to provide a channel memory length selection apparatus based on the channel memory length method in accordance with the present invention.

According to one aspect of the present invention, a channel memory length selection method for wireless communication systems is provided. The method comprises estimating an initial channel impulse response (CIR) for the wireless communication system; determining a first refined CIR with a first group of taps and a second refined CIR with a second group of taps based upon the initial CIR, number of the second group of taps being less than number of the first group of taps; and selecting either the number of the first group of taps or the number of the second group of taps as the channel memory length according to an energy concentration criterion in regard to the first refined CIR and the second refined CIR, in which the first refined CIR is determined by selecting a CIR with a maximum characteristic value among all CIRs with tap counts equal to the number of the first group of taps in the initial CIR and the second refined CIR is determined by selecting another CIR with the maximum characteristic value among all CIRs with tap counts equal to the number of the second group of taps in the initial CIR.

The present invention also provides another channel memory length selection method for wireless communication systems. The method comprises estimating an initial channel impulse response (CIR) for the wireless communication system; determining a first refined CIR with a first group of taps by selecting a CIR with maximum energy among all CIRs with tap counts equal to the number of the first group of taps based upon the initial CIR; determining a second refined CIR with a second group of taps by selecting a CIR with maximum energy among all CIRs with tap counts equal to the number of the second group of taps based upon the initial CIR, number of the second group of taps being less than number of the first group of taps; deriving a first smoothed energy evaluation of present burst from energy of the first refined CIR of the present burst and the first smoothed energy evaluation of previous burst; deriving a second smoothed energy evaluation of present burst from the energy of the second refined CIR of the present burst and the second smoothed energy evaluation of the previous burst; and switching the channel memory length to either the number of the first group of taps or the number of the second group of taps according to a criterion in regard to the first smoothed energy evaluation and the second smoothed energy evaluation.

The invention also provides a channel memory length selection apparatus for wireless communication systems. The channel memory length selection apparatus includes a processing unit and a memory unit. The processing unit includes a main control module, an estimating module for estimating an initial CIR, a determining module for determining refined CIRs for computing smoothed energy evaluations, a deriving module, and a channel selecting module for switching the channel memory length to a refined CIR length.

BRIEF DESCRIPTION OF THE DRAWINGS

The nature of this invention, as well as other objects and advantages thereof, will be explained in the following with reference to the accompanying drawings, in which.

DETAILED DESCRIPTION OF THE INVENTION

Preferred embodiments of a channel memory length selection method for wireless communication systems in accordance with the present invention will be described below in detail with reference to the accompanying drawings.

Figure 1:
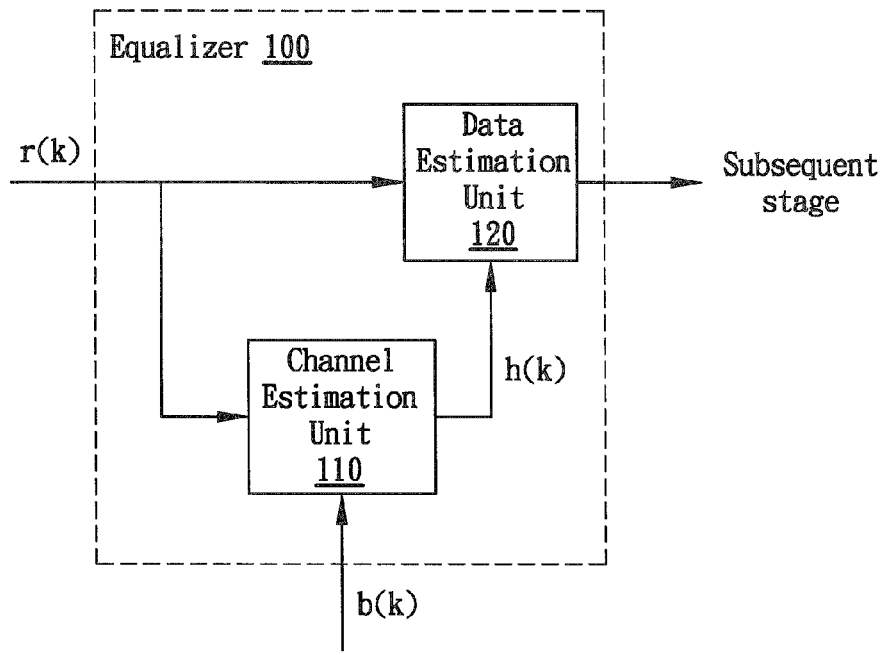
FIG. 1 shows a schematic block diagram of a typical equalizer in accordance with prior arts.
Figure 2:
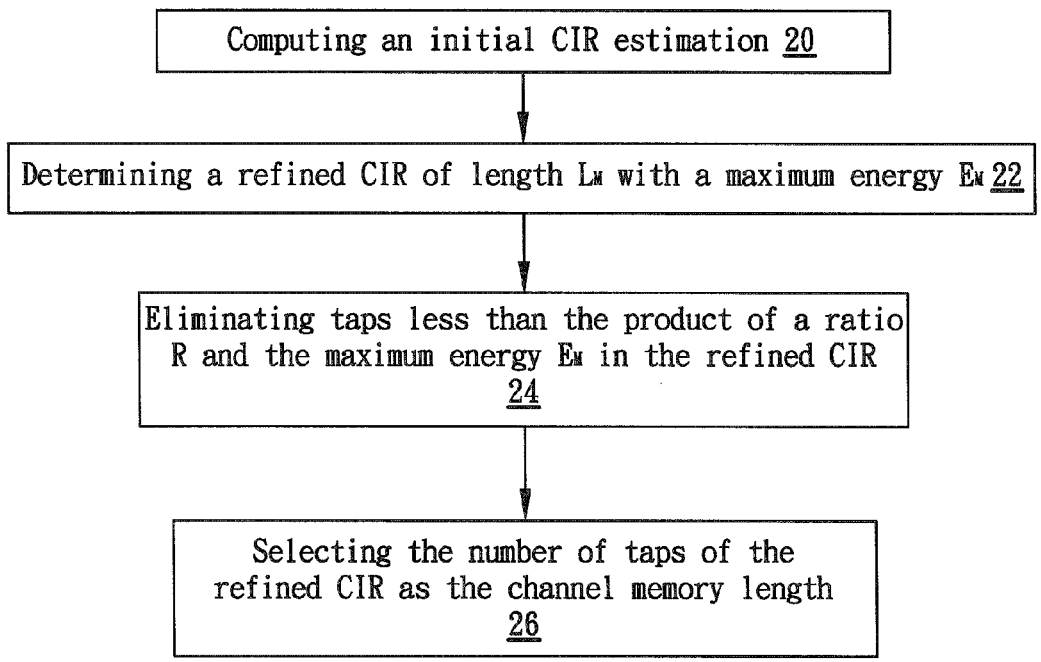
FIG. 2 shows a known method to select an appropriate channel memory length best fitting the actual communication environment.
Figure 3:
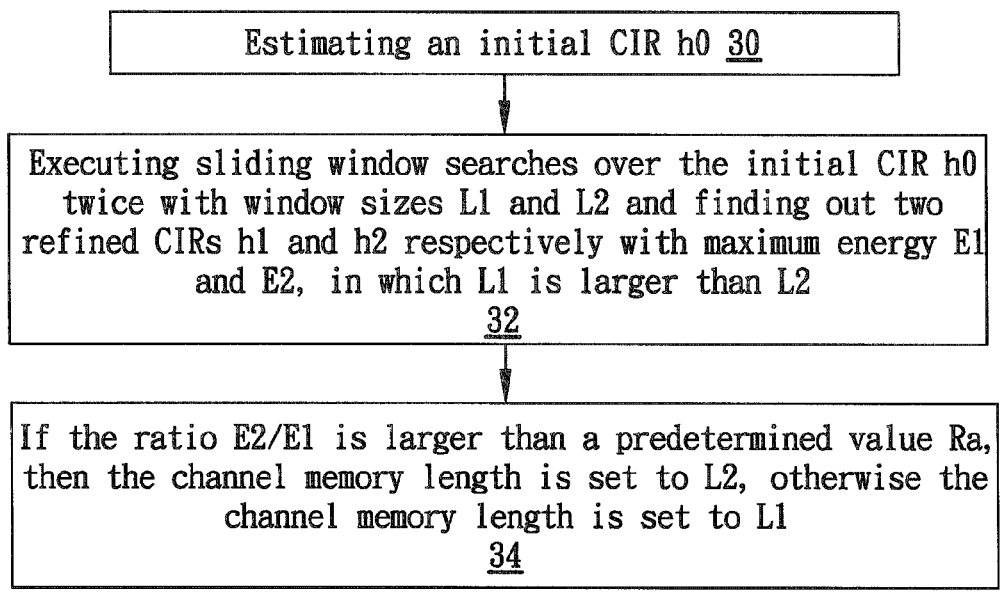
FIG. 3 shows a flowchart diagram of a channel memory length selection method in accordance with a preferred embodiment of the present invention.

FIG. 3 shows a flowchart diagram of a channel memory length selection method in accordance with a preferred embodiment of the present invention, and the method includes estimating an initial channel impulse response (CIR) h0 (step 30); executing sliding window searches over the initial CIR h0 twice with window sizes L1 and L2 and finding out two refined CIRs h1 and h2 respectively with maximum energy E1 and E2, in which L1 is larger than L2 (step 32); if the ratio E2/E1 is larger than a predetermined value Ra, then the channel memory length is set to L2, otherwise the channel memory length is set to L1 (step 34). The Steps (30 and 32) setting a window size to L1 (respectively L2) and executing a sliding window search are to search the initial CIR h0 for a subset CIR with L1 (respectively L2) taps. The window size L1 may be selected as the largest possible CIR length (number of taps) in practical system, jointly considering the longest path delay spread and the desired complexity of the corresponding equalizer. Likewise, L2 may be selected as the CIR length in very short delay spread channels, jointly considering the characteristics of transmitter/receiver filter and propagation environment.

In a preferred embodiment in accordance with the present invention, the predetermined value Ra is preferably larger than 0.9. A typical example of Ra is 0.95. When the ratio E2/E1 is larger than such a predetermined value Ra, it means most channel energy has concentrated within the L2 taps. Therefore it is reasonable to set the channel memory length to L2. On the other hand, when the ratio E2/E1 is less than the predetermined value Ra, the more complicated situation should be taken into consideration, and thus the channel memory length is set to the longer number L1.

Determining a refined CIR by checking its energy should not be considered as a limitation to the present invention. Other characteristic value of a CIR may be used as a variation of the present invention.

The channel memory length selection method could be executed on a burst-by-burst basis in embodiments of the present invention. In practice, the mobile terminal will not keep changing rapidly between distinct signal propagation areas, for example, between hilly places, city, or countryside. Therefore, the channel profile statistic characteristics should be relatively stable for a period of time. As a consequence, the channel memory length should remain unchanged during the period of time. The switching between different channel memory lengths should not occur too frequently. The following variation of the present invention will take this observation into consideration.

Figure 4:
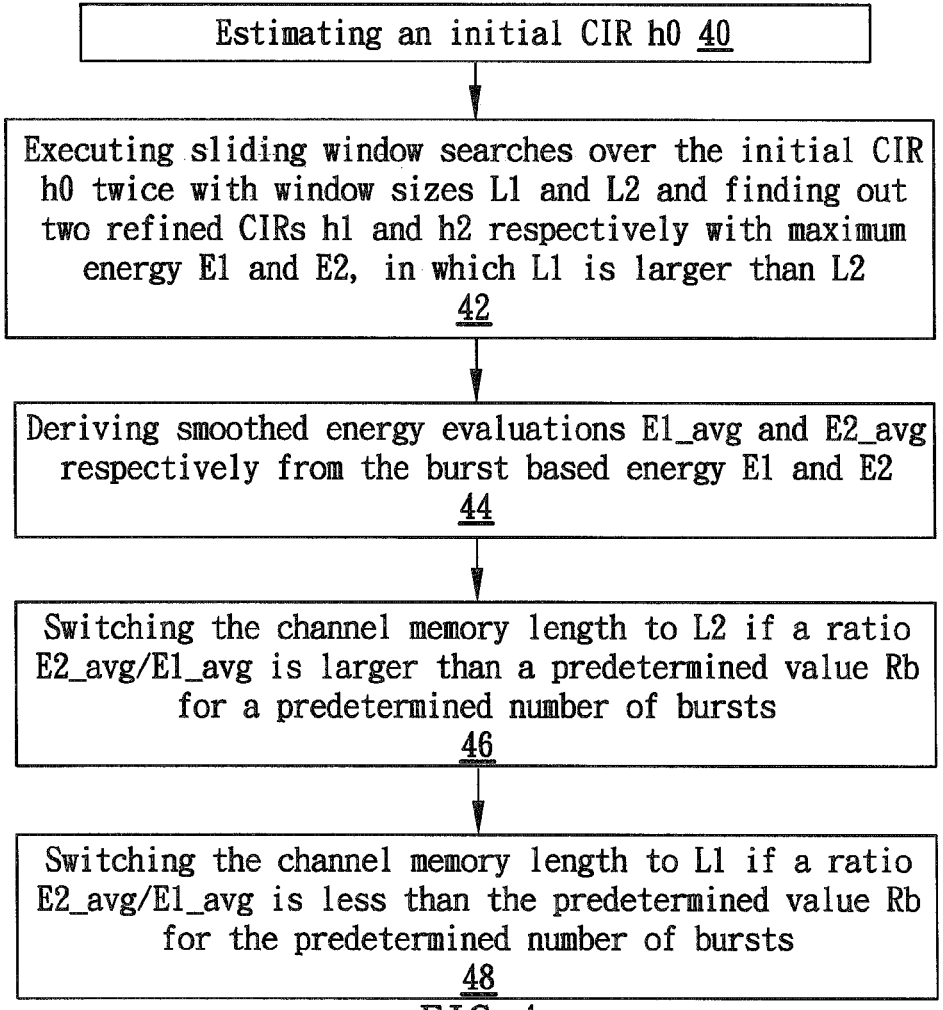
FIG. 4 shows a flowchart diagram of a channel memory length selection method in accordance with another embodiment of the present invention.

FIG. 4 shows a flowchart diagram of a channel memory length selection method in accordance with another embodiment of the present invention, the method includes estimating an initial channel impulse response (CIR) h0 (step 40); executing sliding window searches over the initial CIR h0 twice with window sizes L1 and L2 and finding out two refined CIRs h1 and h2 respectively with maximum energy E1 and E2, in which L1 is larger than L2 (step 42); deriving smoothed energy evaluations E1_avg and E2_avg respectively from the burst based energy E1 and E2 through a formula $Ei\_avg = r*Ei\_avg\_p + (1-r)*Ei$, in which "i" represents 1 or 2, r is a linear combination weighting coefficient, and Ei_avg_p is the corresponding smoothed energy evaluation of the previous burst (step 44); switching the channel memory length to L2 if a ratio E2_avg/E1_avg is larger than a predetermined value Rb for a predetermined number of bursts (step 46); switching the channel memory length to L1 if a ratio E2_avg/E1_avg is less than the predetermined value Rb for the predetermined number of bursts (step 48).

In a preferred embodiment in accordance with the present invention, the predetermined value Rb is preferably larger than 0.9. A typical example of Rb is 0.95.

In a preferred embodiment in accordance with the present invention, the channel memory length selection method is implemented in the form of program code, and a counting variable cnt and a threshold T are introduced to trace the times that E2_avg/E1_avg is larger than the predetermined value Rb and the predetermined number of bursts. Other software scheme may be employed to attain the similar purpose. The persent invention, however, is not limited to how much variables have been used to fine tune the efficiency of the program code.

As mentioned above, a method in accordance with the present invention may be implemented in the form of program code, which can readily be embodied by those skilled in the art on the basis of above detail disclosure. The program code performing the disclosed channel memory length selection method may be implemented in a computing architecture such as a digital signal processor (DSP), a general purpose micro-processor, or an application specific integrated circuit (ASIC).

Figure 5:
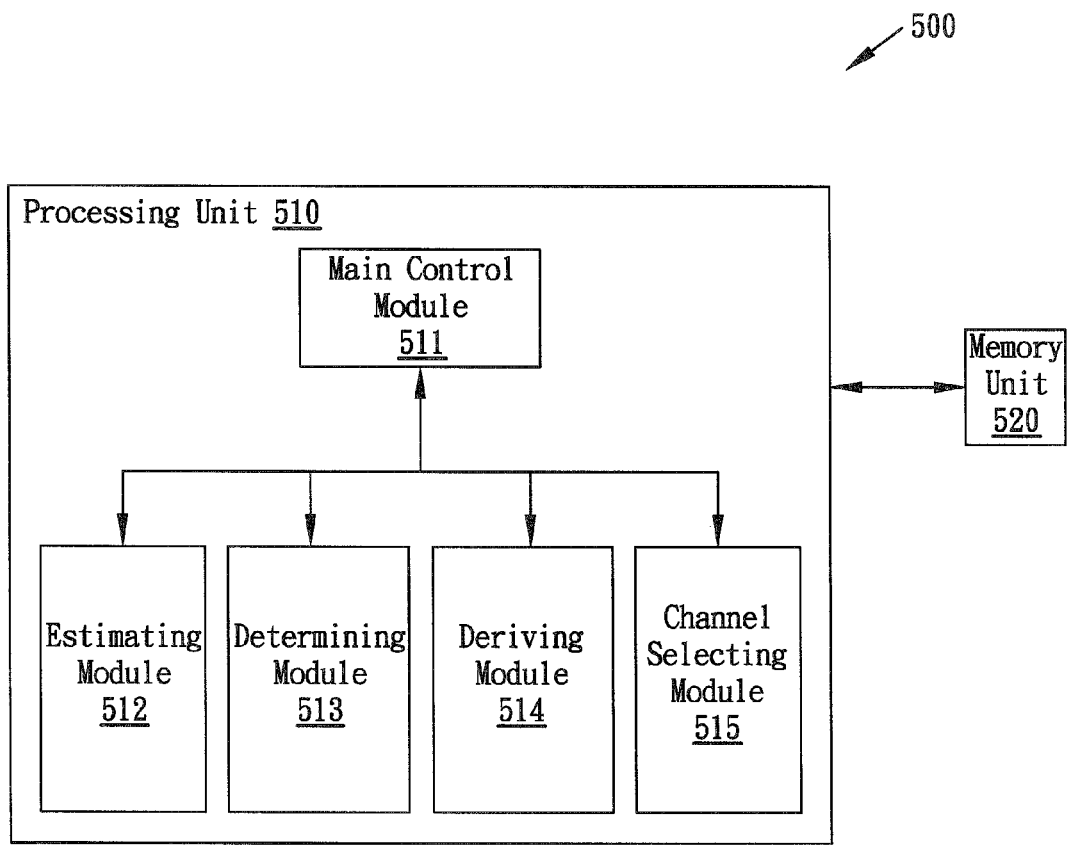
FIG. 5 shows a schematic block diagram of a channel memory length selection apparatus in accordance with an embodiment of the present invention.

The invention also includes a channel memory length selection apparatus for wireless communication systems. FIG. 5 shows a schematic block diagram of a channel memory length selection apparatus 500 in accordance with an embodiment of the present invention. The channel memory length selection apparatus 500 includes a processing unit 510 and a memory unit 520. The processing unit 510 includes a main control module 511, an estimating module 512, a determining module 513, a deriving module 514, and a channel selecting module 515.

The processing unit 500 may be a sub-system which is, but not limit to, DSP-based, ASIC or micro-processor based architecture. Modules 511 to 515 may be software routines or subroutines executed in the processing unit 500. The main control module 511 may be a software routine for handling main routine control. The methods disclosed in foregoing embodiments may be implemented by properly designed logic operations or program instructions which properly invoke the estimating module 512, the determining module 513, the deriving module 514, and the channel selecting module 515 in the main control module 511 to attain the channel memory length selection function. Alternatively, modules 511 to 515 may be properly configured logic elements in an ASIC to implement the channel selection method disclosed herein.

Particularly, the estimating module 512 is for estimating the initial CIR. The determining module 513 is for determining the refined CIRs. The Deriving module 514 is for computing the smoothed energy evaluations. The channel selecting module 515 is for switching the channel memory length to a refined CIR length according to methods as described in aforementioned embodiments.

The memory unit 520 may include but not limit to a DRAM (dynamic random access memory), an SRAM (static random access memory), or a general purpose register. Specific constants such as the predetermined values Ra and Rb as defined in foregoing examples may be stored in the memory unit 520.

In a preferred embodiment under the EGPRS (Enhanced General Packet Radio Service) system, L1, L2, r, Rb, and the predetermined number of bursts are respectively set to 7, 4, 0.5, 0.95 and 20. In this embodiment, because the linear combination weighting coefficient r is set to 0.5, the smoothed energy evaluation of the present burst is thus an arithmetic mean of the energy of the corresponding refined CIR of the present burst and the smoothed energy evaluation of the previous burst. The resulted BLER (Block Error Rate) comparison between the disclosed invention and a fixed CIR method is shown in the table below:

| propagation environment and system parameter | | | | BLER comparison | |
|---|---|---|---|---|---|
| Ch. profile | Ch. coding type | I/f type | I/f intensity | Present invention | Fixed CIR method |
| HT100 | MCS5 | SI | SNR = 19.5 dB | 0.0181704 | 0.6226775 (L = 4) |
| RA250 | MCS5 | CCI | C/I = 17.5 dB | 0.0394737 | 0.0538847 (L = 7) |
| TU50 | MCS6 | ACI | C/I = 2 dB | 0.0499165 | 0.0703843 (L = 7) | in which SI, CCI, and ACI represents "Sensitivity Interference", "Co-Channel Interference", and "Adjacent-Channel Interference" respectively. I/f represents interference. The disclosed method prevails over the system without channel memory length selection in all propagation environments.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A channel memory length selection method for a wireless communication system, the method comprising:
   estimating an initial channel impulse response (CIR) for the wireless communication system;
   determining a first refined CIR with a first group of taps and a second refined CIR with a second group of taps based upon the initial CIR, number of the second group of taps being less than number of the first group of taps; and
   selecting either the number of the first group of taps or the number of the second group of taps as the channel memory length according to an energy concentration criterion in regard to the first refined CIR and the second refined CIR,
   wherein the first refined CIR is determined by selecting a CIR with a maximum characteristic value among all CIRs with tap counts equal to the number of the first group of taps in the initial CIR and the second refined CIR is determined by selecting another CIR with the maximum characteristic value among all CIRs with tap counts equal to the number of the second group of taps in the initial CIR;
   wherein the energy concentration criterion comprises a ratio of the characteristic value of the second refined CIR to the characteristic value of the first refined CIR, and the channel memory length is set according to the ratio.

2. The method as claimed in claim 1, wherein the characteristic value is a sum of all taps in corresponding CIR.

3. The method as claimed in claimed 2, wherein if the ratio is larger than a perdetermined value, then the channel memory length is set to the number of the second group of taps, otherwise the channel memory length is set to the number of the first group of taps.

4. The method as claimed in claim 3, wherein the perdetermined value is larger than or equal to 0.9.

5. The method as claimed in claim 2, wherein the first group of taps and the second group of taps are both contiguous series within the initial CIR.

6. The method as claimed in claim 2, wherein the initial CIR is estimated by computing a cross-correlation of a predetermined number of bits of a training sequence and a received signal in a burst.

7. The method as claimed in claim 2, wherein the number of the first group of taps covers the longest path delay spread of the wireless communication system.

8. The method as claimed in claim 2, wherein the number of the first group of taps covers the maximum equalizer complexity of the wireless communication system.

9. The method as claimed in claim 2, wherein the number of the second group of taps covers the shortest path delay spread of the wireless communication system.

10. A channel memory length selection method for a wireless communication system, the method comprising:
    estimating an initial channel impulse response (CIR) for the wireless communication system;
    determining a first refined CIR with a first group of taps by selecting a CIR with maximum energy among all CIRs with tap counts equal to the number of the first group of taps based upon the initial CIR;
    determining a second refined CIR with a second group of taps by selecting a CIR with maximum energy among all CIRs with tap counts equal to the number of the second group of taps based upon the initial CIR, number of the second group of taps being less than number of the first group of taps;

deriving a first smoothed energy evaluation of a present burst from energy of the first refined CIR of the present burst and the first smoothed energy evaluation of a previous burst;

deriving a second smoothed energy evaluation of the present burst from the energy of the second refined CIR of the present burst and the second smoothed energy evaluation of the previous burst; and switching the channel memory length to either the number of the first group of taps or the number of the second group of taps according to a criterion in regard to the first smoothed energy evaluation and the second smoothed energy evaluation.

11. The method as claimed in claim 10, wherein the first smoothed energy evaluation of the present burst is derived from a linear combination of the energy of the first refined CIR of the present burst and the first smoothed energy evaluation of the previous burst, and the second smoothed energy evaluation of the present burst is derived from the linear combination of the energy of the second refined CIR of the present burst and the second smoothed energy evaluation of the previous burst.

12. The method as claimed in claim 11, wherein the linear combination is an arithmetic mean with both linear combination weighting coefficients equal to 0.5.

13. The method as claimed in claim 11, wherein the criterion is in accordance with a ratio of the second smoothed energy evaluation of the present burst to the first smoothed energy evaluation of the present burst.

14. The method as claimed in claim 13, wherein the channel memory length is switched to the number of the second group of taps when the ratio is larger than a predetermined value for a predetermined number of bursts.

15. The method as claimed in claim 14, wherein the channel memory length is switched to the number of the first group of taps when the ratio is less than the predetermined value for the predetermined number of bursts.

16. A channel memory length selection apparatus for a wireless communication system, the apparatus comprising a processing unit and a memory unit, the processing unit comprising:

an estimating module for estimating an initial channel impulse response (CIR);

a determining module for determining a refined CIR with a sub-group of taps in the initial CIR by selecting a CIR with maximum energy among all CIRs with tap counts equal to the number of the group of taps based upon the initial CIR;

a deriving module for deriving a smoothed energy evaluation of a present burst from energy of the refined CIR of the present burst and the smoothed energy evaluation of a previous burst; and a channel selecting module for switching the channel memory length according to a criterion in regard to the smoothed energy evaluation.

17. The apparatus as claimed in claim 16, wherein the smoothed energy evaluation of the present burst is derived from a linear combination of the energy of the refined CIR of the present burst and the smoothed energy evaluation of the previous burst.

18. The apparatus as claimed in claim 17, wherein the linear combination is an arithmetic mean with both linear combination weighting coefficients equal to 0.5.

19. The apparatus as claimed in claim 18, wherein the criterion is in accordance with a ratio between two smoothed energy evaluations of different refined CIRs of the present burst.

20. The apparatus as claimed in claim 19, wherein the channel selecting module is invoked according to a comparison operation result between the ratio and a predetermined value.

* * * * *